United States Patent [19]

Cuypers et al.

[11] 4,234,716

[45] Nov. 18, 1980

[54] PROCESS FOR THE SEPARATION OF POLYOLEFINS MANUFACTURED AT LOW PRESSURE

[75] Inventors: Hervé Cuypers, Cérouxmoousty; Paul Baekelmans, Genval, both of Belgium

[73] Assignee: Solvay & Cie., Brussels, Belgium

[21] Appl. No.: 941,671

[22] Filed: Sep. 12, 1978

[30] Foreign Application Priority Data

Sep. 12, 1977 [FR] France .............................. 77 27700

[51] Int. Cl.³ .............................................. C08F 6/02
[52] U.S. Cl. .................................................. 528/483
[58] Field of Search ........................................ 528/483

[56] References Cited

U.S. PATENT DOCUMENTS

| | | | |
|---|---|---|---|
| 3,008,944 | 11/1961 | Wilson | 528/483 |
| 3,269,997 | 8/1966 | Lyons et al. | 528/483 |
| 3,780,137 | 12/1973 | Hassell | 528/483 |

OTHER PUBLICATIONS

Crystalline Olefin Polymers, 1, Raff et al., p. 371 (1965).

Primary Examiner—Stanford M. Levin
Attorney, Agent, or Firm—Spencer & Kaye

[57] ABSTRACT

A process for the separation of polyolefins manufactured at low pressure with the aid of catalysts. Carbon monoxide is added to the reaction mixture resulting from the polymerization. The process makes it possible to obtain perfectly homogeneous polyolefins which can be used for the manufacture of films and fibers.

12 Claims, No Drawings

PROCESS FOR THE SEPARATION OF POLYOLEFINS MANUFACTURED AT LOW PRESSURE

BACKGROUND OF THE INVENTION

The present invention relates to a process for the separation of polyolefins, manufactured by low-pressure polymerization with the aid of catalysts such as those comprising a transition metal compound and an organometallic activator, from the reaction mixture resulting from the polymerization.

It is known that alpha-olefins can be polymerized, for example, in the presence of catalysts based on transition metal compounds and organometallic compounds, which are known to those skilled in the art by the name of Ziegler catalysts.

Similar so-called superactive catalysts are now available, the catalytic activity of which is sufficiently high to enable the elimination of the formerly indispensable operation which consists in purifying the polymers obtained from the catalyst residues which are present therein, in the low-pressure manufacture of polyolefins such as high-density polyethylene and isotactic polypropylene.

Nevertheless, when employing these superactive catalysts, it remains desirable to deactivate the catalysts which remain in the presence of the unreacted monomer after the actual polymerization state. In fact, if this deactivation is not carried out, a post-polymerization takes place in the installations located downstream from the polymerization chamber.

Since this type of polymerization is generally carried out at a pressure greater than atmospheric pressure, and the reaction mixture resulting from the polymerization is then most frequently subjected to a pressure release in a pressure release zone separate from the polymerization chamber in order to facilitate the recovery of the unreacted monomer, the postpolymerization during this pressure release is a source of serious disadvantages.

In fact, the physico-chemical conditions which prevail during this pressure release are different from those prevailing in the polymerization chamber. In particular, the temperature, the pressure and the concentration of the constituents of the medium are different. This leads to the formation of polymers which by no means have the same characteristics as the manufactured polymer, and heterogeneities of composition, of properties and of surface appearance of the latter are consequently found.

The problem is particularly critical in the very frequent case of polymerization processes which incorporate an agent for regulating the average molecular weight of the polymer (hydrogen being most frequently used for this purpose) and a catalyst which is sensitive to the action of this regulator.

In fact, under these conditions, since the pressure in the pressure release zone is lower than that in the polymerization chamber, the ratio of the concentration of hydrogen to the concentration of the residual monomer is lower in this zone than in the polymerization chamber. If the post-polymerization is not prevented from occurring in the pressure release zone, polymers having a much higher molecular weight than the average molecular weight of the manufactured polymer are formed therein.

The presence of these very high molecular weight polymers renders the polymer unsuitable for the manufacture of products such as films or fibers.

In order to avoid the above-mentioned disadvantages, it has already been proposed to prevent the postpolymerization from occurring in the installations located downstream from the polymerization chamber by adding polymerization inhibitors to the reaction mixture which results from the polymerization and contains the catalyst and the unreacted monomer.

Thus, it has already been proposed to add water to this mixture, as a liquid deactivator, and in particular to add it to the above-mentioned pressure release zone. However, this technique is not satisfactory if the organic medium contains a liquid hydrocarbon diluent. In fact, under these conditions, an organic phase and a separate aqueous phase form, which makes it difficult to recover the polymer correctly by the conventional physical means of separation, such as centrifugation. Moreover, if the catalysts used comprise transition metal halides, this addition of water causes their hydrolysis with the liberation of corrosive acid halides. Attempts have been made to neutralize these acid halides, not by adding water as the deactivator, but by adding an aqueous solution of an alkali metal compound, most frequently sodium hydroxide. However, if the catalyst used comprises an organometallic compound of an amphoteric metal (most frequently an organoaluminum compound), the presence of the alkali metal compound causes the pH of the medium to rise and leads to the precipitation of the amphoteric metal (aluminum) hydroxide, with the consequent formation of crusts in the installations and the presence of a solid phase, together with the above-mentioned organic and aqueous phases, which complicates the recovery of the polymer even further.

An attempt could be made to avoid the presence of two separate liquid phases by not exceeding the solubility of water in the hydrocarbon diluent or by using steam. However, under these conditions, it is not possible to avoid substantial corrosion which appears especially in the installations for recovering the hydrocarbon diluent and the residual monomer.

Other liquid deactivators which are conventionally used for purifying polyolefins from catalyst residues, such as alcohols, diketones, alkylene oxides and the like, cannot be suitable either, in the very case where the activity of the catalyst used is such that it enables this purification to be avoided. In fact, the need to recover these deactivators nullifies the economy achieved by employing this type of catalyst.

Finally, attempts have been made to overcome the disadvantages relating to the use of liquid deactivators by substituting them with gaseous deactivators. However, no really satisfactory results have been recorded with the known gaseous deactivators.

Thus, the introduction of oxygen into the reaction mixture resulting from the polymerization presents dangers, in view of the explosive or flammable mixtures which the latter can create with the residual monomer or with the liquid hydrocarbon diluent. Ammonia imparts an undesirable coloration to the final polymer. Nitrous oxide must be employed in very large amounts in order to effectively prevent the post-polymerization from occurring. Finally, carbon dioxide must also be employed in very large amounts in order to stop the polymerization effectively. Furthermore, its solidification temperature, which is relatively high under pressure, leads to technological difficulties such as blockages during the recovery of the unreacted monomer, in particular when the latter is recovered by distillation under pressure.

SUMMARY OF THE INVENTION

There has now been found in accordance with the present invention, a process which no longer exhibits the abovementioned disadvantages and does not entail any further disadvantage.

The present invention provides a process for the separation of polyolefins, manufactured by low pressure polymerization with the aid of a catalyst, from the reaction mixture resulting from the polymerization, which comprises adding carbon monoxide to the reaction mixture.

It has been found that in the present invention, carbon monoxide can be added to a reactive mixture coming from olefin polymerization without presenting the difficulties or drawbacks connected with the use of other known poisons and without leading to any other drawbacks.

It is to be understood that both the foregoing general description and the following detailed description are exemplary, but are not restrictive of the invention.

DETAILED DESCRIPTION OF THE INVENTION

The process according to the present invention can be applied to any olefin which is polymerized at low pressure with the aid of a catalyst which can be poisoned by carbon monoxide. This catalyst can be, for example, a chromium compound, such as hexavalent chromium oxide, deposited on a support such as alumina. However, the process according to the present invention is especially suitable for separating polyolefins which are manufactured with the aid of catalysts comprising a transition metal compound and an organometallic compound, and more particularly a halogen-containing transition metal compound and an organo-aluminum compound. Very good results have been recorded in the case of catalysts comprising chlorine-containing titanium compounds.

In general, the polyolefins which can be separated according to the present invention are obtained from alpha-olefins, the molecule of which contains from 2 to 18, and preferably from 2 to 6, carbon atoms, such as ethylene, propylene, n-but-1-ene, n-pent-1-ene, methyl-but-1-enes, n-hex-1-ene and 3- and 4-methylpent-1-enes. The process according to the present invention is particularly valuable in the case of crystalline polyolefins, such as high-density polyethylene and isotactic polymers of propylene, of but-1-ene and of 4-methylpent-1-ene. These polyolefins can be both homopolymers and copolymers obtained by copolymerizing the abovementioned olefins with one another and also with diolefins containing from 4 to 18 carbon atoms. The diolefins employed in the copolymers are preferably unconjugated aliphatic diolefins such as hexa-1, 4-diene, unconjugated monocyclic diolefins such as 4-vinylcyclohexene, alicyclic diolefins having an endocyclic bridge, such as dicyclopentadiene and methylene- and ethylene-norbornene, and conjugated aliphatic diolefins such as butadiene or isoprene.

The polyolefins to which the present invention applies can be manufactured in accordance with any known process, such as by solution or suspension polymerization in an inert hydrocarbon diluent or bulk polymerization in one or more of the monomers kept in the liquid state, or also by gas phase polymerization.

When the polymerization is carried out in the gas phase, the reactors used are advantageously those in which the reaction mixture is fluidized by means of a gaseous stream of monomer. If the polymerization is carried out in suspension in the liquid monomers or in an inert liquid hydrocarbon diluent, the reaction is preferably carried out in a reactor which consists of one or more closed chambers equipped with stirring means and devices for removing heat. The reactors can be of the tubular or kettle type. They can also be closed-loop tubular reactors in which the liquid medium is circulated by means of an axial-flow pump. In the case of several closed chambers, the latter can be arranged in parallel or connected in series. These chambers are equipped with pipes for the introduction of the constituents of the polymerization medium and for the removal of the effluent. The polymerization can be carried out continuously or discontinuously. When an inert liquid hydrocarbon diluent is used, the latter is generally chosen from among aliphatic or cycloaliphatic hydrocarbons such as butane, pentane, hexane, heptane, cyclohexane, methylcyclohexane or mixtures thereof. The diluent can also advantageously be the monomer which is itself to be polymerized, kept in the liquid state, for example liquid propylene. The polymerization temperature and the polymerization pressure are chosen as a function of the monomer or monomers to be polymerized and of the type of polymerization in question. They are generally chosen, respectively, between 20° and 200° C. and between atmospheric pressure and 50 atmospheres. In the particular case of the suspension polymerization of propylene in an inert hydrocarbon diluent, they are preferably chosen, respectively, between 50° and 80° C. and between 10 and 40 atmospheres, the pressure of course being a function of the temperature used. Finally, the polymerization can be carried out in the presence of other additives such as molecular weight regulators like, for example, hydrogen.

According to the present invention, carbon monoxide is added to the reaction mixture resulting from the polymerization. This mixture contains the polyolefin, the unreacted monomer and the catalyst employed for the polymerization. It can also contain an inert liquid hydrocarbon diluent as well as a molecular weight regulator.

The physical state of this mixture at the time when the carbon monoxide is added depends on the type of polymerization and on the treatments to which this mixture is subjected after the polymerization. It most frequently comprises a solid phase, which generally consists of the polyolefin particles containing the catalyst, and a liquid and/or gas phase comprising the other constituents and, in particular, the unreacted monomer, a certain amount of which can, however, be absorbed by (or adsorbed on) the polyolefin particles. The particles can be suspended in the liquid and/or gas phase or they can simply be in contact with this phase without being dispersed therein.

In certain particular cases, the solid phase can be in forms other than particles. This is the case, for example, when a polyolefin solution is subjected to a sudden pressure release under certain temperature, pressure and concentration conditions, so that the polyolefin solidifies in the form of small fibers. The present invention can also be applied mutatis mutandis to these particular cases.

The carbon monoxide can be added to the reaction mixture at any time between the polymerization and the end of the separation of the polyolefin particles from the other constituents of the reaction mixture, that is to say the time at which the polyolefin in the solid phase is no longer in contact at all with the monomer present in the liquid and/or gas phase. When the reaction mixture is subjected to a pressure release, the carbon monoxide is preferably added at the time of the pressure release. This pressure release can be carried out in a single stage or in several stages, at decreasing intermediate pressures. Additional inert liquid hydrocarbon diluent, steam for distilling the residual monomer, customary polymer additives such as stabilizers, lubricants, strengthening agents and fillers can be added at the time of the pressure release.

According to the present invention, the carbon monoxide can be employed essentially pure or mixed with other substances such as a solid support, on which the carbon monoxide is adsorbed or in which it is absorbed, or a gas, preferably inert, with which it is mixed, or a liquid in which it is dissolved. It can optionally be mixed with another known catalyst poison. In order to facilitate the determination and monitoring of the amount of carbon monoxide to be introduced, it is preferably mixed with an inert gas such as nitrogen, the mixture then being in the gaseous state under the conditions of its addition. The inert gas and the carbon monoxide can be added in any respective proportions. For reasons of safety, a mixture containing, for example, from about 5 to 20% by volume of carbon monoxide in the inert gas can be prepared.

The amount of carbon monoxide which it is necessary to add to the reaction mixture obviously depends on its ability to poison the catalyst used. This amount can easily be determined by those skilled in the art, taking into account that it is desirable to completely stop the polymerization in as short a period of time as possible. However, it is of no disadvantage to introduce an amount which is greater than that required to completely stop the polymerization. In fact, a very great advantage of the present invention arises from the fact that even the addition of a large amount of carbon monoxide does not impart any undesirable coloration to the polymer and in no way complicates the subsequent separation of this deactivator from the unreacted monomer.

In the particular preferred case of polyolefins manufactured with the aid of catalysts comprising a chlorine-containing titanium compound, it is sufficient, in order to completely stop the polymerization, to add an amount of about 0.1 mol of carbon monoxide per mol of titanium compound. With superactive catalysts based on titanium trichlorides, such as those described in Belgian Patent 780,758, filed on Mar. 16, 1972 in the name of Solvay & Cie., this amount approximately corresponds to a concentration of 2 volumes per million, relative to the monomer.

The solid phase comprising the polyolefin can be separated from the liquid phase by means of any technique which is suitable for this operation and, for example, by filtration, centrifugation or decantation. The polymer itself can be subjected to conventional treatments, inter alia, in order to separate it from the inert liquid hydrocarbon diluent which may still be present, and in order to dry it, stabilize it and granulate it.

As regards the monomer, it can also be recovered and purified in a known manner, for example by distillation under pressure. In this case, the use of carbon monoxide in the gaseous state as the deactivator proves particularly advantageous, in view of the facility with which it can be separated from the medium. Moreover, in view of the very small amounts of this deactivator which are required in order to completely stop the polymerization, no problem of toxicity nor of harmful effects on the environment is to be feared.

As mentioned above, the process according to the present invention makes it possible, simply and elegantly, to avoid the post-polymerization of alpha-olefins in the installations located downstream from the polymerization chamber, and the substantial disadvantages which this post-polymerization entails.

The polyolefins subjected to the process according to the present invention are suitable for all the usual applications of these products and, in particular, for the most severe applications as regards their homogeneity, such as the manufacture of films and fibers. The process of the present invention makes it possible to obtain perfectly homogeneous polyolefins which can be used for the manufacture of films and fibers.

The invention is illustrated by the following example.

EXAMPLE

Propylene dissolved in technical-grade hexane is polymerized continuously, in a reactor which is completely filled with liquid and provided with stirring and cooling devices, at a temperature of 70° C. and under a pressure of 40 kg/cm$^2$, in the presence of a catalyst system comprising particles of a superactive titanium trichloride, the preparation of which is described in Example 1 of Belgian Pat. No. 780,758, filed on Mar. 16, 1972 in the name of Solvay & Cie, and a chlorine-containing alkylaluminium compound, and of hydrogen as a molecular weight modifier. The polymerization is carried out so that a reaction mixture comprising 5,000 liters of hexane, in which 1,000 kg of essentially isotactic polypropylene are suspended, is withdrawn from the reactor per hour. The productivity of the catalyst system used is such that the polypropylene contains about 35 mg of titanium per kg. This content approximately corresponds to 0.73 gram atom of titanium introduced into the reactor per hour. Furthermore, the hydrogen concentration in the polymerization medium is adjusted so as to obtain a polypropylene having a melt index which represents the average molecular weight and is measured in accordance with ASTM Standard Specification D1238 under a load of 2.16 kg at 230° C., of about 10 dg/10 minutes. The polypropylene thus obtained is particularly suitable for conversion into films by processing in accordance with the conventional extrusion methods.

The reaction mixture produced from the polymerization reactor is subjected to a pressure release in a vat under an absolute pressure of 5.5 kg/cm$^2$. A mixture of nitrogen and carbon monoxide, containing 10% by volume of the latter, is introduced into the pressure release vat in an amount of 50 l (S.T.P.) per hour. This amount is considerably greater than the amount required in order to deactivate the catalyst. In fact, taking account of the catalyst content of the organic medium and the efficiency of the carbon monoxide, it is found that, under the above-mentioned conditions, 16 l (S.T.P.) per hour of the mixture stated above (that is to say 1.6 l (S.T.P.) of CO/hour), are sufficient to completely stop the polymerization.

The suspension produced from the pressure release vat is then treated in a conventional manner in order to collect the manufactured polymer. This polymer, which is stabilized and granulated in a known manner, was processed by extrusion in order to manufacture a 200 micron thick film. Examination of a sample of this film shows that it easily satisfies the most exacting specifications defined for this type of article.

By way of comparison, the manufacture of the polypropylene identified above is repeated, the only difference being that no mixture of nitrogen and carbon monoxide is introduced into the pressure release vat.

The polymer collected is stabilized, granulated and converted into film as indicated above.

Examination of a sample having identical dimensions to the sample described above reveals the presence of about 1,000 heterogeneities, which of course renders the polypropylene film, from which this sample is taken, totally inacceptable for the normal applications of this type of article.

It will be understood that the above description of the present invention is susceptible to various modifications, changes and adaptations, and the same are intended to be comprehended within the meaning and range of equivalents of the appended claims.

What is claimed is:

1. Process for the separation of a polyolefin, manufactured by low pressure polymerization of at least one alpha-olefin monomer with the aid of a catalyst, from the reaction mixture resulting from the polymerization and containing the polyolefin, the unreacted monomer, and the catalyst, comprising: adding carbon monoxide to the reaction mixture.

2. Process according to claim 1, wherein the polymerization is carried out with the aid of a catalyst comprising a transition metal compound and an organometallic compound.

3. Process according to claim 2, wherein the polymerization is carried out in the presence of a catalyst comprising a halogen-containing transition metal compound and an organoaluminium compound.

4. Process according to claim 3, wherein the polymerization is carried out in the presence of a catalyst comprising a chlorine-containing titanium compound.

5. Process according to claim 4, wherein about 0.1 mol of carbon monoxide is employed per mol of chlorine-containing titanium compound.

6. Process according to claim 1, wherein the polymerization is carried out in the presence of a molecular weight regulator.

7. Process according to claim 6, wherein the molecular weight regulator is hydrogen.

8. Process according to claim 1, wherein the carbon monoxide is employed in a mixture with an inert gas.

9. Process according to claim 8, wherein nitrogen is employed as the inert gas.

10. Process according to claim 1, wherein the carbon monoxide is added to the reaction mixture between the polymerization and the end of the separation of the polyolefin from the other constituents of the reaction mixture.

11. Process according to claim 1, further comprising subjecting said reaction mixture to a pressure release and adding said carbon monoxide at the time of said pressure release.

12. Process according to claim 1, wherein the pressure during polymerization is between atmospheric pressure and 50 atmospheres.

* * * * *